(12) United States Patent
Kemppainen et al.

(10) Patent No.: US 12,131,601 B2
(45) Date of Patent: Oct. 29, 2024

(54) ELEVATOR ACCESS CONTROL

(71) Applicant: KONE Corporation, Helsinki (FI)

(72) Inventors: Mika Kemppainen, Helsinki (FI); Antti Perko, Helsinki (FI); Tomio Pihkala, Helsinki (FI)

(73) Assignee: KONE CORPORATION, Helsinki (FI)

( * ) Notice: Subject to any disclaimer, the term of this patent is extended or adjusted under 35 U.S.C. 154(b) by 0 days.

(21) Appl. No.: 17/963,584

(22) Filed: Oct. 11, 2022

(65) Prior Publication Data
US 2023/0035825 A1 Feb. 2, 2023

Related U.S. Application Data

(63) Continuation of application No. PCT/FI2020/050366, filed on May 29, 2020.

(51) Int. Cl.
*G07C 9/00* (2020.01)
*G07C 9/27* (2020.01)

(52) U.S. Cl.
CPC ..... *G07C 9/00571* (2013.01); *G07C 9/00309* (2013.01); *G07C 9/27* (2020.01); *G07C 2209/02* (2013.01)

(58) Field of Classification Search
CPC .. G07C 9/00571; G07C 9/00309; G07C 9/27; G07C 2209/02
See application file for complete search history.

(56) References Cited

U.S. PATENT DOCUMENTS

| | | | |
|---|---|---|---|
| 8,880,200 B2 * | 11/2014 | Nowel | B66B 1/468 700/83 |
| 10,544,007 B2 * | 1/2020 | Hwang | B66B 5/0012 |
| 2010/0294600 A1 * | 11/2010 | Christy | B66B 1/468 187/383 |
| 2016/0368732 A1 | 12/2016 | Zhao et al. | |
| 2018/0099840 A1 * | 4/2018 | Armistead | G05B 19/042 |
| 2018/0182199 A1 | 6/2018 | Yamine | |

FOREIGN PATENT DOCUMENTS

EP 2 257 489 B1 2/2017

OTHER PUBLICATIONS

International Search Report, issued in PCT/FI2020/050366, dated Oct. 9, 2020.
Written Opinion of the International Searching Authority, issued in PCT/FI2020/050366, dated Oct. 9, 2020.

* cited by examiner

*Primary Examiner* — Mohamed Barakat
(74) *Attorney, Agent, or Firm* — Birch, Stewart, Kolasch & Birch, LLP (57) ABSTRACT

An apparatus for managing access to one or more elevators of a building is configured to: receive, for a plurality occupants of the building, a respective occupant registration request including at least occupant characteristics recorded for the respective occupant; assign each occupant into one of a plurality of occupant groups based on the occupant characteristics recorded for the respective occupant, wherein each occupant group has respective access rights with respect to said one or more elevators that are different from access rights of other occupant groups in terms of a time schedule of accessing said one or more elevators; and selectively allow or disallow an occupant of the building to access said one or more elevators in accordance with the access rights of the occupant group into which said occupant is assigned.

28 Claims, 2 Drawing Sheets

Receive, for a plurality of occupants in a building, a respective occupant registration request including at least occupant characteristics recroded for the respective occupant

302

---

Assign each occupant into one of a plurality of occupant groups based on the occupant characteristics recorded for the respective occupant, wherein each occupant group has respective access rights with respect to said one or more elevators that are different from access rights of other occupant groups in terms of a time schedule of accessing said one or more elevators

304

---

Selectively allow or disallow an occupant of the building to access said one or more elevators in accordance with the access rights of the occupant group into which said occupant is assigned

ELEVATOR ACCESS CONTROL

CROSS REFERENCE TO RELATED APPLICATIONS

This application is a Continuation of PCT International Application No. PCT/FI2020/050366, filed on May 29, 2020, which is hereby expressly incorporated by reference into the present application.

TECHNICAL FIELD

The example and non-limiting embodiments of the present invention relate to controlling access of people in one or more locations of a building and, in particular, controlling access of people to closed spaces of the building, such as elevators.

BACKGROUND

The recent outbreak of Covid-19 virus has resulted in restrictions for public gatherings in terms of a maximum number of persons gathering together and/or minimum number distance between people with the aim of preventing or at least lowering the risk of an infected person passing the virus to other persons. While using the Covid-19 as an example, similar precautions are quite obviously valid in prevention of other viruses or bacteria from being passed from one person to another.

While at a personal level a straightforward personal measure for reducing the risk of receiving an infectious virus or bacteria from another person is to keep a sufficient distance to other people in general and to people that appear to suffer from symptoms of some kind in particular, a person carrying an infectious virus or bacteria may not exhibit any symptoms that are readily recognizable by other people and/or the person carrying such a virus or bacteria may not recognize her/himself as a potential source of infection. The risk of receiving an infectious virus or bacteria via airborne infection may be especially pronounced in small closed spaces where people are 'forced' to gather into a relatively close to each other, such as waiting rooms, lobby areas of buildings, public transportation vehicles, elevators, etc.

SUMMARY

It is an object of the present invention to provide a technique that facilitates reducing contacts between persons within a closed space.

According to an example embodiment, an apparatus for managing access to one or more elevators of a building is provided, the apparatus configured to: receive, for a plurality occupants of the building, a respective occupant registration request including at least occupant characteristics recorded for the respective occupant; assign each occupant into one of a plurality of occupant groups based on the occupant characteristics recorded for the respective occupant, wherein each occupant group has respective access rights with respect to said one or more elevators that are different from access rights of other occupant groups in terms of a time schedule of accessing said one or more elevators; and selectively allow or disallow an occupant of the building to access said one or more elevators in accordance with the access rights of the occupant group into which said occupant is assigned.

According to another example embodiment, a system for managing access to one or more elevators of a building is provided, the system comprising the apparatus according to the example embodiment described in the foregoing.

According to another example embodiment, a method for managing access to one or more elevators of a building is provided, the method comprising: receiving, for a plurality of occupants in the building, a respective occupant registration request including at least occupant characteristics recorded for the respective occupant; assigning each occupant into one of a plurality of occupant groups based on the occupant characteristics recorded for the respective occupant, wherein each occupant group has respective access rights with respect to said one or more elevators that are different from access rights of other occupant groups in terms of a time schedule of accessing said one or more elevators; and selectively (306) allowing or disallowing an occupant of the building to access said one or more elevators in accordance with the access rights of the occupant group into which said occupant is assigned.

According to another example embodiment, a computer program for managing access to one or more elevators of a building is provided is provided, the computer program comprising computer readable program code configured to cause performing at least the method according to the example embodiment described in the foregoing when said program code is executed on one or more computing apparatuses.

The computer program according to the above-described example embodiment may be embodied on a volatile or a non-volatile computer-readable record medium, for example as a computer program product comprising at least one computer readable non-transitory medium having the program code stored thereon, which, when executed by one or more computing apparatuses, causes the computing apparatuses at least to perform the method according to the example embodiment described in the foregoing.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings, where.

DESCRIPTION OF SOME EMBODIMENTS

Figure 1:
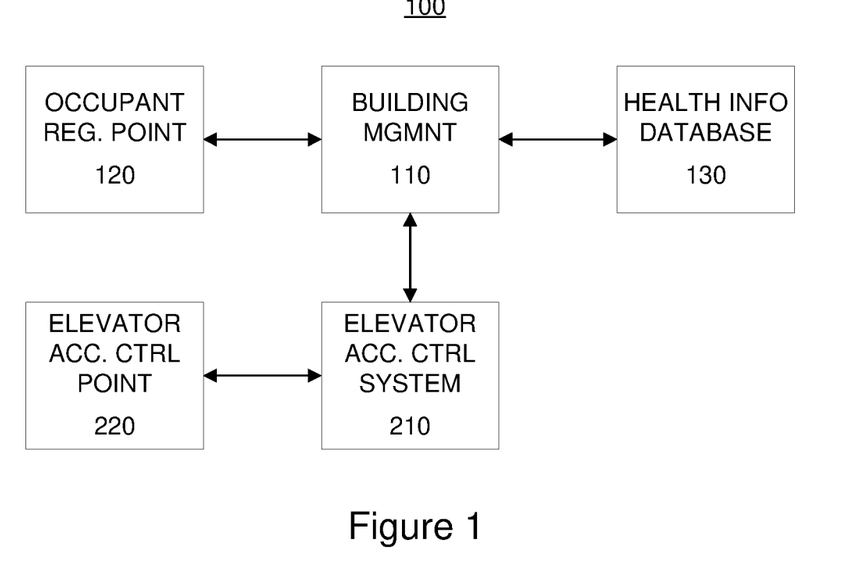
FIG. 1 illustrates a block diagram of some logical elements of an access control system according to an example.

FIG. 1 illustrates a block diagram of some logical elements of an access control system 100 according to an example. The access control system 100 may serve to control access to one or more elevators of a building and/or to control access to one or more spaces in a building via one or more elevators. FIG. 1 shows the access control system 100 with a building management system 110 for controlling one or more functionalities and/or services of in a building, an occupant registration point 120 for registering a person to the building management system upon the person entering the building, an elevator access control system 210 for managing occupant access to one or more elevators in the building, and an elevator access control point 230 for controlling occupant access to one or more elevators of the building. The access control system 100 may further comprise or it may be communicatively coupled to a health information database 130 that is arranged to store pre-recorded health information for a plurality of persons.

In the present disclosure, the term occupant is applied to refer to any person who is currently in the building. In case of a residential building the occupant may hence be a person living in the building or a person visiting the building, whereas in case of an office building or a public building of other type the occupant may be a person working in the building or a person visiting the building. In other words, the term occupant does not imply a status either as a resident of the building or a visitor of the building but encompasses both these possibilities. Hence, in the framework of the access control system 100, a person entering the building becomes a (current) occupant of the building and, conversely, she/he ceases to be a (current) occupant of the building upon exiting the building. Alternatively, the occupant may be referred to as a tenant or a visitor without implying either permanent or temporary status with respect to her/his occupancy in the building.

The building management system 110 may comprise a computer-based platform for controlling various aspects concerning functionalities and services in the building, such as heating, ventilation, and air conditioning (HVAC), lighting, access control, etc. In this regard, the building management system 110 may comprise or consist of a respective control sub-systems for controlling HVAC, lighting, access control etc. The building management system 110 or any of its sub-systems may comprise or may be provided using one or more computing devices comprising respective one or more processors arranged to execute one or more computer programs to provide at least some aspects of operation of the building management system 110 or the respective sub-system thereof.

In context of the present disclosure, an aspect of interest related to the building management system 110 is the access control provided via operation of the elevator access control system 210 and, consequently, other aspects related to operation of the building management system 110 are described only to extent they are necessary for describing examples that pertain to controlling access to the one or more elevators of the building Along the lines described in the foregoing, the occupant registration point 120 may be arranged to enable registering a person to the building management system 110 upon the person entering the building, thereby enabling a person entering the building to register him/herself as a current occupant of the building. The occupant registration point 110 may comprise or it may be provided using a computing device comprising one or more processors arranged to execute one or more computer programs to provide at least some aspects of operation of the occupant registration point 110.

Each person entering the building may be required to register (e.g. 'sign in') at the occupant registration point 120 upon entering the building and, conversely, to deregister (e.g. 'sign out') at the at the occupant registration point 120 upon exiting the building. Consequently, the building management system 110 may have an up-to-date information regarding current occupants of the building. In the following, for clarity and brevity of the description, the term occupant is applied to refer to a person that aims at registering herself/himself as an occupant of the building or to a person that has already registered herself/himself as an occupant of the building.

According to an example, the building may have a single occupant registration point 120 e.g. at an (single) entrance thereto, whereas in other examples the building may have a plurality of occupant registration points, e.g. at each entrance to the building. Hence, although only a single occupant registration point 120 is shown in the illustration of FIG. 1, in a general case each entrance to the building may be provided with respective one or more registration points 120. Nevertheless, for clarity and brevity of description but without imposing a limitation, the following examples refer to the single occupant registration point 120.

An occupant may carry out the registration using her/his personal access credential at the occupant registration point 120, whereas the occupant may subsequently use this personal access credential at the elevator access control point 220. Upon an occupant registering himself/herself at the registration point 120 using his/her personal access credential, information in this regard is transferred from the occupant registration point 120 to the building management system 110, where the personal access credential may be associated with an occupant identifier (ID). The occupant ID may uniquely identify the occupant in the framework of the access control system 100.

The personal access credential may comprise a personal access device assigned to the occupant or a biometric characteristic (such as a fingerprint) of the occupant. Examples of personal access devices include a smartcard, an electronic key fob, an electronic identity card or an electronic access badge of other type that is capable of short-range wireless communication with the occupant registration point 120. A further example of a personal access device includes the occupant's mobile device (e.g. a mobile phone) that is capable of short-range wireless communication with the occupant registration point 120. Non-limiting examples of suitable wireless communication techniques for communication between the personal access device and the occupant registration point 120 include near-field communication (NFC) technology, radio-frequency identification (RFID), Bluetooth, Bluetooth Low Energy, Bluetooth Mesh Networking, wireless local area networking (e.g. Wi-Fi technology), ZigBee or other techniques of personal area networking, etc.

The occupant registration point 120 may be arranged to record the body temperature of an occupant upon the occupant registering thereat. As an example in this regard, the occupant registration point 120 may comprise a user-operable equipment for non-contact body temperature measurement known in the art that operates to measure and to automatically record the measured body temperature of an occupant for transmission to the building management system 110 together with the occupant's personal access credential provided upon registration at the occupant registration point 120. In another example, the occupant registration point 120 may enable off-line body temperature measurement e.g. by authorized personnel of the building and means for the authorized personnel to record the measured body temperature for subsequent transmission to the building management system 110 together with the occupant's personal access credential provided upon registration at the occupant registration point 120.

The occupant registration point 120 may be arranged to record one or more further characteristics of an occupant in addition to the body temperature upon the occupant registering therein. Non-limiting examples of such characteristics include age of the occupant, gender of the occupant, etc. In this regard, the occupant registration point 120 may be provided, for example, a camera for capturing one or more images of the occupant and the occupant registration point 120 may be arranged to apply an image processing algorithm known in the art to derive or estimate characteristics such as the age and/or the gender of the occupant for subsequent transmission to the building management system 110 together with occupant's personal access credential.

The information pertaining to the occupant may be referred to as (recorded) occupant characteristics. According to an example, the occupant characteristics comprise the body temperature recorded for the occupant possibly and they may further comprise the age recorded for the occupant and/or gender recorded for the occupant. In another example, the occupant characteristics comprise the age recorded for the occupant possibly and they may further comprise the body temperature recorded for the occupant and/or gender recorded for the occupant.

Once the occupant characteristics have been recorded upon registration, the occupant registration point 120 may transmit an occupant registration request to the building management system 110 to indicate the newly registered person as a current occupant of the building, wherein the occupant registration request comprises the recorded occupant characteristics and the occupant's personal access credential applied at the occupant registration point 120 upon registering. When the occupant deregisters at the occupant registration point 120 upon exiting the building, the occupant registration point 120 may transmit an occupant deregistration request to the building management system 110 to indicate the occupant no longer being a current occupant of the building, wherein the occupant deregistration request comprises the occupant's personal access credential applied at the occupant registration point 120 upon deregistering The interface between occupant registration point 120 and the building management system 110 may be provided using a wired communication network, using a wireless communication network, or using a combination of a wireless communication network and a wireless communication network. In an example, the communication network(s) for coupling the occupant registration point 120 to the building management system 110 may comprise an Internet of Things (IoT) system or an IoT platform.

Upon receiving the occupant registration request, the building management system 110 may add the occupant identified by the personal access credential included in the occupant registration request into a list of current occupants of the building. Conversely, upon receiving the occupant deregistration request, the building management system 110 may remove the occupant identified by the personal access credential included in the occupant deregistration request from the list of current occupants of the building. In this regard, the building management system 110 may be arranged to determine or assign the occupant ID to the occupant identified by the personal access credential received in the registration/deregistration request and to forward the registration/deregistration request complemented by the occupant ID to the elevator access control system 210 for further use and/or processing therein. Alternatively, instead of complementing the registration/deregistration request with the occupant ID before transmitting it to the elevator access control system, the building management system 110 may replace the personal access credential therein with the occupant ID.

In an example, the building management system 110 may be arranged to complement the occupant characteristics included in the occupant registration request by one or more aspects that are descriptive of health of the respective occupant via consulting the health information database 130 (if available) before forwarding the occupant registration request to the elevator access control system 210. The occupant's personal access credential and/or the occupant ID may be applied to identify the occupant to the health information database 130, e.g. such that the building management system 110 transmits a request to the health information database for one or more aspects that are descriptive of health of the respective occupant, whereas the health information database 130 responds with the requested health information if such information is available for the occupant under consideration. As an example, the health information available in the health information database 130 may comprise, for a plurality of persons, a respective status indication pertaining to one or more medical conditions. In this regard, the status indication for a certain medical condition, may indicate one of the following: the occupant has not suffered from the certain medical condition, the occupant is currently suffering from the certain medical condition, the occupant has recovered from the certain medical condition. As a non-limiting example in this regard, the certain medical condition may comprise Covid-19 infection or another medical condition arising from an infectious virus or bacteria.

In another example, the building management system 110 may be arranged to complement the occupant characteristics included in the occupant registration request by one or more administrative aspects assigned to the respective occupant before forwarding the occupant registration request to the elevator access control system 210. Examples of such administrative aspects include an indication of the respective occupant's status as a resident/employee of the building or as a visitor to the building or a priority indication assigned to the respective occupant (e.g. low/regular/high) in terms of access to the one or more elevators. Such administrative aspects may be provided as predefined information stored in a memory or database accessible by the building management system 110.

The building control system 110 may be further arranged to carry out further operations based in the determined occupant ID, either in dependence or independently of the body temperature recorded for the occupant, e.g. operations that relate to general access control in the building. However, along the lines described in the foregoing, in context of the present disclosure an aspect of interest is the access control provided via operation of the elevator access control system 210 and, consequently, and other aspects pertaining the building management system 110 are described only to extent they are relevant for examples that pertain to operation of the elevator access control system 210.

The building management system 110 may be communicatively coupled to the elevator access control system 210 using a wired communication network, using a wireless communication network, or using a combination of a wireless communication network and a wireless communication network.

Along the lines described in the foregoing, the elevator access control system 210 may be arranged to manage occupant access to one or more elevators the building. The elevator access control system 210 is to be construed as a logical entity that may be provided as part of an elevator control system that is arranged for controlling several aspects related to the operation of elevators in the building or the elevator access control system 210 or as an entity that is communicatively coupled to the elevator control system (e.g. via a wired and/or wireless communication network or communication link). However, in the present disclosure other aspects of elevator control are described only to extent they are relevant for examples that pertain to operation of the elevator access control system 210. The elevator access control system 210 may comprise or it may be provided using one or more computing devices comprising respective one or more processors arranged to execute one or more computer programs to provide at least some aspects of operation of the elevator access control system 210.

In the course of its operation, the elevator access control system 210 may receive, from the building management system 110, a plurality of occupant registration requests that include at least the occupant ID and the occupant characteristics recorded for the respective occupant and a plurality of occupant deregistration requests that include at least the occupant ID. Consequently, the elevator access control system 210 is arranged to maintain an inventory or list of current occupants of the building. The elevator access control system 210 may be further arranged to assign each occupant of the building into one of a plurality of occupant groups. In this regard, each occupant group may be defined via respective one or more criteria pertaining to one or more occupant characteristics, whereas assigning an occupant to one of the occupant groups may comprise identifying an occupant group whose definition matches the occupant characteristics recorded for said occupant and assigning the occupant into the identified occupant group.

According to an example, the assignment into occupant groups may comprise assigning each occupant into one of the plurality of occupant groups at least in dependence of the one or more aspects that are descriptive of health of an occupant recorded for the respective occupant. As an example in this regard, the assignment may be carried out at least in dependence of a status indication concerning a predefined medical condition, where the status indication may indicate one of the following: the respective occupant has not suffered from the predefined medical condition, the respective occupant is currently suffering from the predefined medical condition, the respective occupant has recovered from the predefined medical condition and where the plurality of occupant groups comprise a respective occupant group for each of said statuses. As a non-limiting example, the predefined medical condition may comprise Covid-19 infection or another medical condition arising from an infectious virus or bacteria.

According to another example, the assignment into occupant groups may be carried out at least in dependence of the body temperatures recorded for the occupant and the assignment into occupant groups may be carried out based on occupant groups defined by a respective range of body temperatures, e.g. according to one of the following non-limiting examples:

a first occupant group for occupants having a body temperature that is lower than or equal to a threshold temperature and a second occupant group for occupants having a body temperature that is higher than the threshold temperature, where the threshold temperature may be a predefined value chosen, for example, from a range from 36.5 to 37.5 degrees Celsius, e.g. 37 degree Celsius;

a first occupant group for occupants having a body temperature that is lower than or equal to a first threshold temperature or that is higher than a second threshold temperature and a second occupant group for occupants having a body temperature that is higher than the first threshold temperature but that is lower than or equal to the second threshold temperature, where the first threshold temperature may be a predefined value chosen, for example, from a range from 36 to 37 degrees Celsius, e.g. 36.5 degrees Celsius and the second threshold temperature may be a predefined value chosen, for example, from a range from 37 to 38 degrees Celsius, e.g. 37.5 degrees Celsius.

a first occupant group for occupants having a body temperature that is lower than or equal to a first threshold temperature, a second occupant group for occupants having a body temperature higher than the first threshold temperature but that is lower than or equal to a second threshold temperature, and a third occupant group for occupants having a body temperature that is higher than the second threshold temperature, where the first threshold temperature may be a predefined value chosen, for example, from a range from 36 to 37 degrees Celsius, e.g. 36.5 degrees Celsius and the second threshold temperature may be a predefined value chosen, for example, from a range from 37 to 38 degrees Celsius, e.g. 37.5 degrees Celsius.

Each of the threshold temperatures in the examples above may be set to a respective predefined value e.g. by an operator of the elevator access control system 210, thereby enabling configuration and re-configuration of the body temperature based access control as required.

According to another example, instead of basing the grouping on the one or more aspects that are descriptive of health of an occupant recorded for the respective occupant, the assignment into occupant groups may be carried out in dependence of another occupant characteristics, such as the ages or the genders recorded for the occupants. As an example in this regard, assignment into occupant groups in dependence of the ages recorded for the occupants may be carried out based on occupant groups defined by a respective range of ages, e.g. according to one of the following non-limiting examples:

a first occupant group for occupants at ages lower than or equal to an age threshold and a second occupant group for occupants at ages higher than the age threshold;

a first occupant group for occupants at ages lower than or equal to a first age threshold or at ages higher than a second age threshold and a second occupant group for occupants at ages higher than the first age threshold but lower than or equal to the second age threshold;

a first occupant group for occupants at ages lower than or equal to a first age threshold, a second occupant group for occupants at ages higher than the first threshold temperature but lower than or equal to a second age threshold, and a third occupant group for occupants at ages higher than the second age threshold.

As in the case of body temperature thresholds in the foregoing, each of the age thresholds in the examples above may be set to a respective predefined value e.g. by an operator of the elevator access control system 210, thereby enabling configuration and re-configuration of the age based access control as required.

In a yet further example, the assignment into occupant groups may be carried out in dependence of administrative aspects assigned to the occupants, such as the respective occupant's status as a resident/employee of the building or as a visitor to the building or a priority indication assigned to the respective occupant (e.g. low/regular/high) in terms of access to the one or more elevators.

Each of the previous examples pertain to a grouping that considers only a single aspect of occupant characteristics, whereas in general case the assignment into occupant groups may consider one or more occupant characteristics. As an example in this regard, the assignment into occupant groups may be carried out in dependence of the body temperature and further in dependence of one or more further occupant characteristics, e.g. in dependence of a predefined aspect that is descriptive of health of an occupant recorded for the respective occupant, such as the status indication concerning a predefined medical condition. As another example in this regard, the other occupant characteristic (in addition to the body temperature) under consideration may comprise the ages recorded for the occupants and the assignment into occupant groups may be carried out based on occupant groups defined by a combination of respective ranges of body temperatures and ages, e.g. according to the following non-limiting example:
- a first occupant group for occupants at ages below an age threshold having a body temperature that is lower than or equal to a threshold temperature;
- a second occupant group for occupants at ages below the age threshold having a body temperature that is higher than the threshold temperature;
- a third occupant group for occupants at ages higher than the age threshold having a body temperature that is lower than or equal to the threshold temperature;
- a fourth occupant group for occupants at ages higher than the age threshold having a body temperature that is higher than the threshold temperature.

Along the lines described for the examples provided in the foregoing, the threshold temperature and the age threshold may be set to a respective predefined value e.g. by an operator of the elevator access control system 210, thereby enabling configuration and re-configuration of the age based access control as required.

Consequently, assignment of an occupant into one of the occupant groups may comprise identifying the occupant group whose definition(s) match the occupant characteristics recorded for the occupant and assigning the occupant to the identifying occupant group. According to an example, there is no limit for the number of occupants assigned into an occupant group and, consequently, the assignment may be carried out independently of the number of occupants already assigned to the identified occupant group. In another example, one or more of the plurality of occupant groups may have a respective maximum number of occupants defined therefor and, consequently, in case of assignment of further occupants to the identified group would result in exceeding the maximum number of occupants for the identified occupant group, the identified occupant group may be divided into occupant sub-groups that each have at most the respective maximum number of occupants defined for the respective group. According to an example, the maximum number of occupants for an occupant group may be the same for each of the plurality of occupant groups, whereas in another example the maximum number of occupants may be different across the plurality of occupant groups. For the purposes of allocating the access rights to the occupant groups (as described in the following), occupant sub-groups resulting from division of an occupant group are considered as separate occupant groups.

In general, the plurality of occupant groups comprises two or more occupant groups, where the number of occupant groups may be, e.g. two, three, four, etc. and they may include one or more 'base' groups defined based on applicable value ranges of one or more occupant characteristics (e.g. according to examples described in the foregoing) and/or one or more sub-groups resulting from division of one or more 'base' groups into occupant sub-groups. Each occupant group may be identified by a respective occupant group ID, whereas assigning a certain occupant into one of the plurality of occupant groups may comprise associating the occupant ID assigned for the certain occupant with the occupant group ID of the respective occupant group. Consequently, the elevator access control system 210 may comprise a respective entry for each of the occupants registered as an occupant of the building, where the entry pertaining to a certain occupant may store the following information: the occupant ID, the occupant group ID, the occupant characteristics. This information may be stored in a memory accessible by the elevator access control system 210 and it may be arranged into an occupant information table, an occupant information database or a suitable data structure of other type.

Each of the occupant groups may be granted a different access rights with respect to the one or more elevators of the building in terms of a time schedule of accessing the one or more elevators. As an example in this regard, each of the occupant groups may be allowed to access the one or more elevators of the building according a different time schedule, e.g. such that occupants assigned to a certain occupant group are not allowed to access the elevators at the same time with occupants assigned to the other occupant group(s). The access rights granted for a certain occupant group may define one or more time periods during which occupants of the certain occupant group are allowed to use the one or more elevators and/or one or more time periods during which occupants of the certain occupant group are not allowed to use the one or more elevators. According to an example, the respective access rights assigned to the plurality of occupant groups may be stored in the memory accessible by the elevator access control system 210 and it may be arranged into an occupant group table, an occupant group database or a suitable data structure of other type, where an entry pertaining to a certain occupant group may comprise an occupant group ID and the access rights assigned for the certain occupant group. In another example, the access rights assigned to the certain occupant group may be included in respective entries of the occupant information table/database instead of or in addition to the occupant group ID.

The group-wise scheduling of access rights may be applicable, for example, to avoid allowing occupants having a symptom that may be an indication of a potentially infectious condition in a relatively small closed space together with occupants not currently showing such a symptom, thereby serving to reduce the risk of a passenger of an elevator receiving airborne infection from another passenger of the elevator. Moreover, the division to occupant sub-groups (if applied) may further enable keeping a sufficient distance between the occupants while in the elevator.

Along the lines described in the foregoing, the elevator access control point 220 may be arranged to control access to one or more of the elevators of the building. The elevator access control point 210 may comprise or it may be provided using a computing device comprising one or more processors arranged to execute one or more computer programs to provide at least some aspects of operation of the elevator access control point 210. The elevator access control point 220 may be provided at a point of entry to the one or more elevators and it may be arranged to require an occupant to register upon attempting an entry to one or more elevators. In this regard, the point of entry may be at an elevator door (hence serving only a single elevator) or at an entry point to a space or area of the building that enables entering the one or more elevators.

An occupant may carry out the registration at the elevator access control point 220 using her/his personal access credential, i.e. the same personal access credential applied upon registration at the occupant registration point 120 upon entry to the building, wherein the personal access credential may comprise a personal access device assigned to the occupant or a biometric characteristic, as described in more detail in the foregoing in context of the occupant registration point 120. Upon an occupant registering herself/himself at the elevator access control point 220 using her/his personal access credential, an access request including the occupant's access credential may be transferred from the elevator access control point 220 to the elevator access control system 210.

The elevator access control system 210 may be arranged to obtain the occupant ID associated with the personal access credential received in the access request from the access control point 220. This may comprise the access control system 210 consulting the building management system 110 to obtain the occupant ID associated with the occupant's personal access credential, e.g. such that the elevator access control system 210 sends an occupant ID request comprising the occupant's personal access credential to the building management system 110 and receives a response that includes the occupant ID associated with the occupant's access credential.

The elevator access control system 210 may be arranged to access the occupant information available therein, e.g. the occupant information table/database and/or the occupant group table/database, to identify the occupant group into which the obtained occupant ID is assigned and to identify the access rights pertaining to the identified occupant group. Consequently, the elevator access control system 210 may be arranged to selectively allow or disallow the occupant to access the one or more elevators in accordance with the access rights pertaining to the occupant group into which said occupant ID (and hence the occupant identified within the access control system 100 by this occupant ID) is assigned in view of the current time (in comparison to the time schedule defined in the access rights pertaining to respective occupant group.

Once having made the decision allow or disallow the occupant to access the one or more elevators, the elevator access control system 210 may be arranged to send an access response to access request received from the elevator access control point 220, wherein the access response includes an indication of the occupant under consideration being allowed or disallowed to the enter the one or more elevators and, consequently, the elevator access control point 220 may operate to grant or deny the occupant's access to the one or more elevators accordingly.

Although only a single elevator access control point 220 is shown in the illustration of FIG. 1, in a general case the access control system 100 (and hence the building) may comprise one or more elevator access control points 220. Moreover, the user registration point 120 may also serve as an elevator access control point. The interface between the elevator access control point 220 and the elevator access control system 210 may be provided using a wired communication network, using a wireless communication network, or using a combination of a wireless communication network and a wireless communication network. In an example, the communication network(s) for coupling the elevator access control point 220 to the elevator access control system 210 may comprise an Internet of Things (IoT) system or an IoT platform.

In the foregoing, the assignment of occupants of the building into the plurality of occupant groups is described with references to one or more elevators of a building and, consequently, the occupant groups and the respective access rights assigned thereto may pertain to a single elevator or to a plurality of elevators. According to an example, the on occupant groups and the respective access rights defined using the approach described in the foregoing may pertain to all elevators of the building, whereas according to another example the occupant groups and the respective access rights defined using the approach described in the foregoing may pertain to a first group of one or more elevators of the building, whereas the approach described in the foregoing may be applied to define a different occupant grouping and/or respective access rights for a second group of one or more other elevators of the building.

In the foregoing, the description makes references to user entering or exiting the building via the occupant registration point(s) 120 and to current occupants of the building. In this regard, the description readily generalizes into a scenario where the occupant registration point(s) 120 pertain to users registering to or deregistering from a certain space or area in the building and hence registered occupants are current occupants of the certain space or area in the building. In a related example, additionally or alternatively, the occupant groups and the associated access right may pertain to managing access to a certain space or area in the building in addition to or instead of being applicable managing access to the one or more elevators of the building.

The example of FIG. 1 involves the occupant registration point(s) 120 communicating with the elevator access control system 210 via the building management system 110. In another example, the building management system may be omitted and the occupant registration point(s) 120 may directly communicate with the elevator access control system 210. In such an example, the derivation or assignment of the occupant ID may be carried out by the elevator access control system 210 (instead of the building management system 110).

In a further variation of the access control system 100, the management and/or storage of access control information may be carried out in a manner different from that described in the foregoing. As an example in this regard, at least part of the occupant related information, e.g. the occupant ID, the occupant group ID and/or the access rights pertaining to this occupant group may be transmitted from the building management system 110 or from the elevator access control system 210 (as applicable) to the occupant registration point 120 upon an occupant carrying out registration therein and stored in the occupant's personal access device. Consequently, upon the user using his/her personal access device at the elevator access control point 210, this information is readily accessible by the elevator access control point 210, which may hence make the decision to grant or deny the occupant's access to the one or more elevators accordingly (e.g. in view of the current time) without consulting the elevator control system 210. In another example, at least part of the occupant related information, e.g. the occupant ID, the occupant group ID and/or the access rights pertaining to this occupant group may be transmitted from the building management system 110 or from the elevator access control system 210 (as applicable) to the elevator access control point 210 upon an occupant carrying out registration at the occupant registration point 110, thereby rendering it readily available for the elevator access control point 210 for making the decision to grant or deny the occupant's access to the one or more elevators accordingly (e.g. in view of the current time) without consulting the elevator control system 210.

Figure 2:
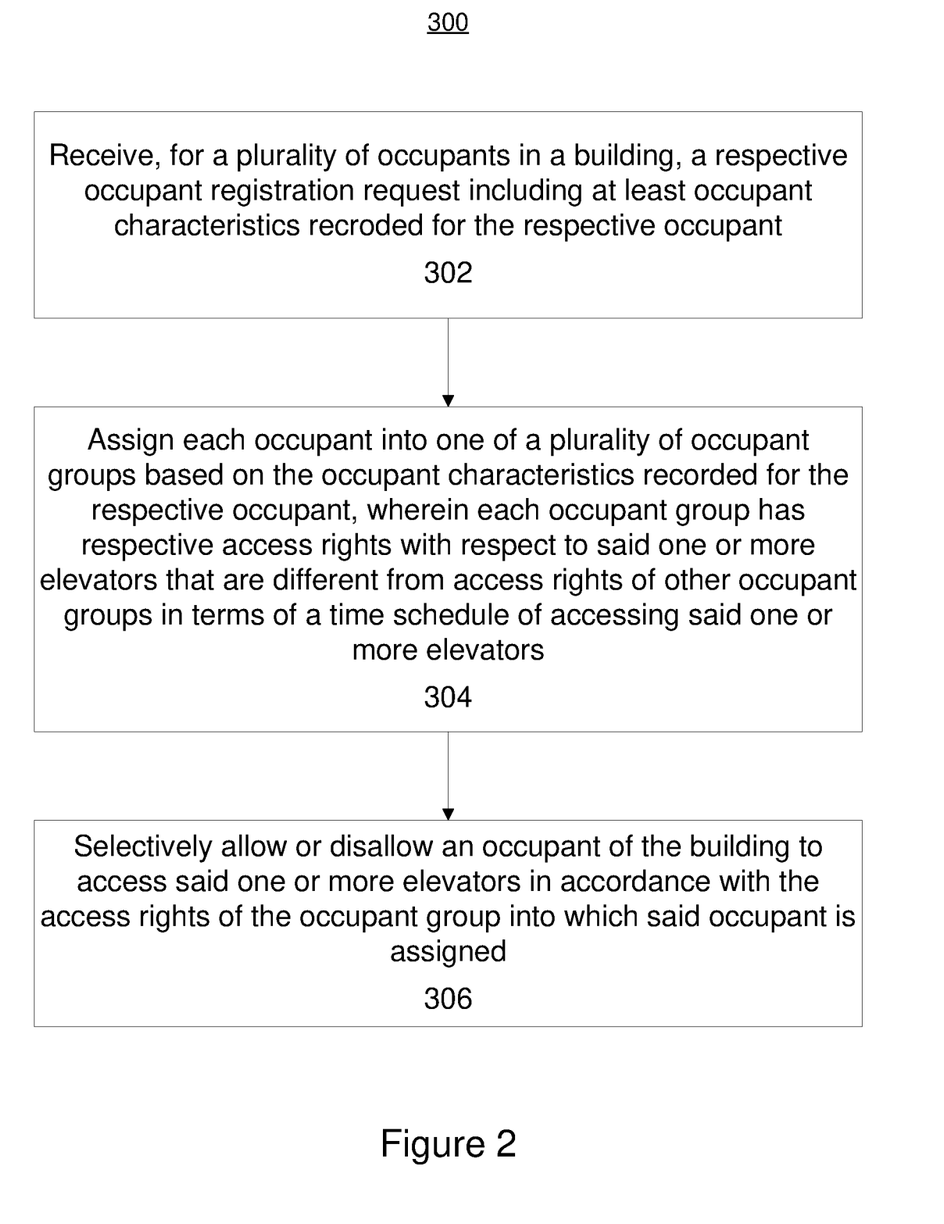
FIG. 2 illustrates a method according to an example.

The operations pertaining to managing the occupant's access to the one or more elevators in the building described in the foregoing with references to the elevator access control system 210 may be described as steps of a method. As an example in this regard, FIG. 2 depicts a flowchart illustrating a method 300, which may be carried out in the elevator access control system 210 in the course of its operation. The method 300 commences from receiving, for a plurality of occupants of the building, a respective occupant registration request including at least occupant characteristics recorded for the respective occupant, as indicated in block 302. The method 300 further comprises assigning each occupant into one of a plurality of occupant groups based on the occupant characteristics recorded for the respective occupant, wherein each occupant group has respective access rights with respect to said one or more elevators that are different from access rights of other occupant groups in terms of a time schedule of accessing said one or more elevators, as indicated in block 304, and selectively allowing or disallowing an occupant of the building to access said one or more elevators in accordance with the access rights of the occupant group into which said occupant is assigned, as indicated in block 306. Respective operations described with references to blocks 302 to 306 pertaining to the method 300 may be implemented, varied and/or complemented in a number of ways, for example as described with references to the access control system 100 and/or to the elevator access control system 210 in the foregoing.

Figure 3:
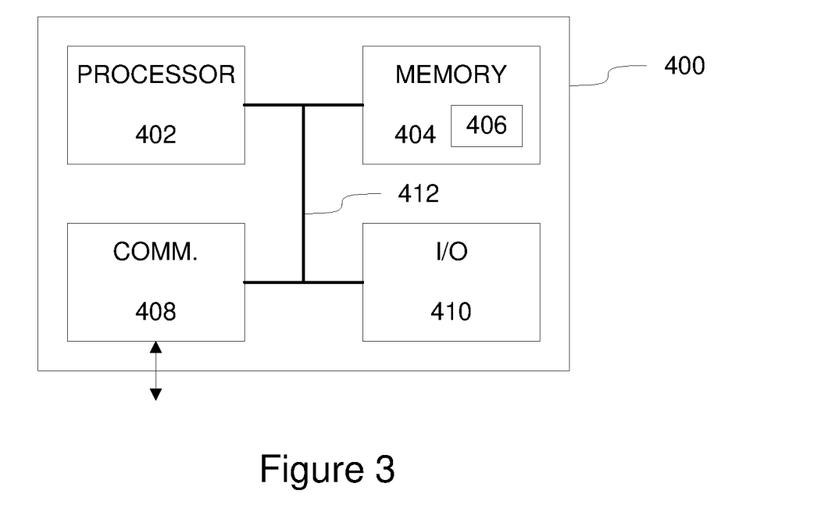
FIG. 3 schematically illustrates an apparatus according to an example.

Along the lines described in the foregoing, the elevator access control system 210 may be implemented via usage of one or more computing devices comprising respective one or more processors arranged to execute one or more computer programs to provide at least some aspects of operation of the elevator access control system 210. As an example in this regard, the operation of the elevator access control system 210 may be provided by an elevator control apparatus, whereas FIG. 3 schematically illustrates some components of an apparatus 400 that may be employed to implement the elevator control apparatus.

The apparatus 400 comprises a processor 410 and a memory 420. The memory 420 may store data and computer program code 425. The apparatus 400 may further comprise communication means 430 for wired or wireless communication with other apparatuses and/or user I/O (input/output) components 440 that may be arranged, together with the processor 410 and a portion of the computer program code 425, to provide the user interface for receiving input from a user and/or providing output to the user. In particular, the user I/O components may include user input means, such as one or more keys or buttons, a keyboard, a touchscreen or a touchpad, etc. The user I/O components may include output means, such as a display or a touchscreen. The components of the apparatus 400 are communicatively coupled to each other via a bus 450 that enables transfer of data and control information between the components.

The memory 420 and a portion of the computer program code 425 stored therein may be further arranged, with the processor 410, to cause the apparatus 400 to perform the method 200 described in the foregoing. The processor 410 is configured to read from and write to the memory 420. Although the processor 410 is depicted as a respective single component, it may be implemented as respective one or more separate processing components. Similarly, although the memory 420 is depicted as a respective single component, it may be implemented as respective one or more separate components, some or all of which may be integrated/removable and/or may provide permanent/semi-permanent/dynamic/cached storage.

The computer program code 425 may comprise computer-executable instructions that implement at least some aspects of operation of the elevator access control system 210 described in the foregoing when loaded into the processor 410. As an example, the computer program code 425 may include a computer program consisting of one or more sequences of one or more instructions. The processor 410 is able to load and execute the computer program by reading the one or more sequences of one or more instructions included therein from the memory 420. The one or more sequences of one or more instructions may be configured to, when executed by the processor 410, cause the apparatus 400 to perform at least some aspects of operation of the elevator access control system 210 described in the foregoing. Hence, the apparatus 400 may comprise at least one processor 410 and at least one memory 420 including the computer program code 425 for one or more programs, the at least one memory 420 and the computer program code 425 configured to, with the at least one processor 410, cause the apparatus 400 to perform at least some aspects of operation of the elevator access control system 210 described in the foregoing.

The computer program code 425 may be provided e.g. a computer program product comprising at least one computer-readable non-transitory medium having the computer program code 425 stored thereon, which computer program code 425, when executed by the processor 410 causes the apparatus 400 to perform at least some aspects of operation of the elevator access control system 210 described in the foregoing. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Reference(s) to a processor herein should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described.

The invention claimed is:

1. An apparatus for managing access to one or more elevators of a building, the apparatus configured to:
   receive, for a plurality occupants of the building, a respective occupant registration request including at least occupant characteristics recorded for the respective occupant;
   assign each occupant into one of a plurality of occupant groups based on the occupant characteristics recorded for the respective occupant, wherein each occupant group has respective access rights with respect to said one or more elevators that are different from access rights of other occupant groups in terms of a time schedule of accessing said one or more elevators; and selectively allow or disallow an occupant of the building to access said one or more elevators in accordance with the access rights of the occupant group into which said occupant is assigned, wherein said occupant characteristics recorded for an occupant comprise one or more aspects that are descriptive of health of the respective occupant, said one or more aspects that are descriptive of health of the respective occupant comprise a status indication with respect to a predefined medical condition, and wherein assigning each occupant to one of the plurality of occupant groups comprises assigning each occupant into one of the plurality of occupant groups at least in dependence of said status, and wherein said plurality of occupant groups comprise a respective occupant group for the following statuses:
not having suffered from said medical condition;
currently suffering from said medical condition; and
recovered from said medical condition.

2. The apparatus according to claim 1, wherein occupants assigned to a first occupant group are not allowed to use said one or more elevators during a time period during which occupants assigned to another occupant group are allowed to use said one or more elevators.

3. The apparatus according to claim 1, wherein access rights of an occupant group define one or more of the following:
one or more first time periods during which occupants assigned to the respective occupant group are allowed to use said one or more elevators; and
one or more second time periods during which occupants assigned to the respective occupant group are not allowed to use said one or more elevators.

4. The apparatus according to claim 1, wherein said one or more aspects that are descriptive of health of the respective occupant comprise the body temperature recorded for the respective occupant, and wherein assigning each occupant to one of the plurality of occupant groups comprises assigning each occupant to one of the plurality of occupant groups at least in dependence of the body temperature recorded for the respective occupant.

5. The apparatus according to claim 4, wherein said plurality of occupant groups comprises two or more occupant groups defined via a respective range of body temperatures.

6. The apparatus according to claim 1, wherein said occupant characteristics pertaining to an occupant comprise one or more further characteristics recorded for the respective occupant, and wherein assigning each occupant to one of the plurality of occupant groups comprises assigning occupants assigned to said plurality of occupant groups at least in dependence of said one or more further characteristic.

7. The apparatus according to claim 6, wherein said one or more further characteristics comprise the age recorded for the respective occupant and/or the gender recorded for the respective occupant.

8. The apparatus according to claim 1, wherein each of the plurality of occupant groups is defined via respective one or more criteria pertaining to one or more occupant characteristics ,and wherein assigning an occupant into one of the plurality of occupant groups comprises:

identifying an occupant group whose definition matches the occupant characteristics recorded for said occupant; and
assigning the occupant into the identified occupant group.

9. The apparatus according to claim 1, wherein at least one of the plurality of occupant groups has a respective maximum number of occupants defined therefor.

10. The apparatus according to claim 9, wherein assigning an occupant into one of the plurality of occupant groups comprises:
identifying an occupant group whose definition matches the occupant characteristics recorded for said occupant;
in case the identified occupant group does not have a respective maximum number of occupants defined therefor or said respective maximum number of occupants has not been reached, assigning the occupant into the identified occupant group; and
in case a respective maximum number of occupants defined for the identified occupant group has been reached, dividing the identified occupant group into two separate occupant groups and assigning the occupant into one of the occupant groups so obtained.

11. The apparatus according to claim 1, wherein selectively allowing or disallowing the occupant of the building to access the one or more elevators comprises:
receiving, from an elevator access control point, an access request pertaining to said occupant;
identifying the occupant group into which said occupant is assigned;
identifying the access rights of the identified occupant group; and
indicating, to the elevator access point, one of allowing or disallowing said occupant to access the one or more elevators.

12. The apparatus according to claim 11, wherein said elevator access point serves as an access control point for one of the following:
an entry point for one of said one or more elevators; and
a space of the building that includes respective entry points for said one or more elevators.

13. An elevator control system comprising the apparatus according to claim 1.

14. The apparatus according to claim 1, wherein the occupant characteristics further comprise non-health characteristics, and assigning each occupant into one of the plurality of occupant groups is further based on the non-health characteristics.

15. A method for managing access to one or more elevators of a building, the method comprising:
receiving, for a plurality of occupants in the building, a respective occupant registration request including at least occupant characteristics recorded for the respective occupant;
assigning each occupant into one of a plurality of occupant groups based on the occupant characteristics recorded for the respective occupant, wherein each occupant group has respective access rights with respect to said one or more elevators that are different from access rights of other occupant groups in terms of a time schedule of accessing said one or more elevators; and
selectively allowing or disallowing an occupant of the building to access said one or more elevators in accordance with the access rights of the occupant group into which said occupant is assigned,
wherein said occupant characteristics recorded for an occupant comprise one or more aspects that are descriptive of health of the respective occupant, said one or more aspects that are descriptive of health of the respective occupant comprise a status indication with respect to a predefined medical condition, and wherein assigning each occupant to one of the plurality of occupant groups comprises assigning each occupant into one of the plurality of occupant groups at least in dependence of said status, and wherein said plurality of occupant groups comprise a respective occupant group for the following statuses:
not having suffered from said medical condition;
currently suffering from said medical condition; and
recovered from said medical condition.

16. The method according to claim 15, wherein occupants assigned to a first occupant group are not allowed to use said one or more elevators during a time period during which occupants assigned to another occupant group are allowed to use said one or more elevators.

17. The method according to claim 15, wherein access rights of an occupant group define one or more of the following:
one or more first time periods during which occupants assigned to the respective occupant group are allowed to use said one or more elevators; and
one or more second time periods during which occupants assigned to the respective occupant group are not allowed to use said one or more elevators.

18. The method according to claim 15, wherein said one or more aspects that are descriptive of health of the respective occupant comprise the body temperature recorded for the respective occupant, and wherein assigning each occupant to one of the plurality of occupant groups comprises assigning each occupant to one of the plurality of occupant groups at least in dependence of the body temperature recorded for the respective occupant.

19. The method according to claim 18, wherein said plurality of occupant groups comprises two or more occupant groups defined via a respective range of body temperatures.

20. The method according to claim 15 wherein said occupant characteristics pertaining to an occupant comprise one or more further characteristics recorded for the respective occupant, and wherein assigning each occupant to one of the plurality of occupant groups comprises assigning occupants assigned to said plurality of occupant groups at least in dependence of said one or more further characteristic.

21. The method according to claim 20, wherein said one or more further characteristics comprise the age recorded for the respective occupant and/or the gender recorded for the respective occupant.

22. The method according to claim 15, wherein each of the plurality of occupant groups is defined via respective one or more criteria pertaining to one or more occupant characteristics, and wherein assigning an occupant into one of the plurality of occupant groups comprises:
identifying an occupant group whose definition matches the occupant characteristics recorded for said occupant; and
assigning the occupant into the identified occupant group.

23. The method according to claim 15, wherein at least one of the plurality of occupant groups has a respective maximum number of occupants defined therefor.

24. The method according to claim 23, wherein assigning an occupant into one of the plurality of occupant groups comprises:
identifying an occupant group whose definition matches the occupant characteristics recorded for said occupant;
in case the identified occupant group does not have a respective maximum number of occupants defined therefor or said respective maximum number of occupants has not been reached, assigning the occupant into the identified occupant group; and
in case a respective maximum number of occupants defined for the identified occupant group has been reached, dividing the identified occupant group into two separate occupant groups and assigning the occupant into one of the occupant groups so obtained.

25. The method according to claim 15, wherein selectively allowing or disallowing the occupant of the building to access the one or more elevators comprises:
receiving, from an elevator access control point, an access request pertaining to said occupant;
identifying the occupant group into which said occupant is assigned;
identifying the access rights of the identified occupant group; and
indicating, to the elevator access point, one of allowing or disallowing said occupant to access the one or more elevators.

26. The method according to claim 25, wherein said elevator access point serves as an access control point for one of the following:
an entry point for one of said one or more elevators; and
a space of the building that includes respective entry points for said one or more elevators.

27. The method according to claim 15, wherein the occupant characteristics further comprise non-health characteristics, and the step of assigning each occupant into one of the plurality of occupant groups is further based on the non-health characteristics.

28. A computer program embodied on a non-transitory computer readable medium and comprising computer readable program code configured to perform the method according to claim 15 when said program code is run on one or more computing apparatuses.

* * * * *